US006237434B1

(12) United States Patent
Brown et al.

(10) Patent No.: US 6,237,434 B1
(45) Date of Patent: May 29, 2001

(54) BALL SCREW AND NUT ASSEMBLY WITH A NUT HAVING A PRELOADED WIPER THREAD AND METHOD OF ITS MANUFACTURE AND OPERATION

(75) Inventors: Mark P. Brown, Florence, SC (US); David A. Sepesi, Whitmore Lake, MI (US)

(73) Assignee: Thompson Saginaw Ball Screw Company, LLC., Saginaw, MI (US)

( * ) Notice: Subject to any disclaimer, the term of this patent is extended or adjusted under 35 U.S.C. 154(b) by 0 days.

(21) Appl. No.: 09/383,293

(22) Filed: Aug. 25, 1999

Related U.S. Application Data
(60) Provisional application No. 60/098,435, filed on Aug. 31, 1998.

(51) Int. Cl.[7] .................................................. F16H 25/22
(52) U.S. Cl. .............................. 74/459; 74/441; 277/354
(58) Field of Search ........................... 74/424.8 R, 441, 74/459; 277/354

(56) References Cited

U.S. PATENT DOCUMENTS

| 3,643,521 | * | 2/1972 | Nilsson .................................. 74/459 |
| 4,052,076 | * | 10/1977 | Wysong ............................. 74/459 X |
| 4,407,511 | * | 10/1983 | Benton et al. ..................... 74/459 X |
| 5,029,877 | * | 7/1991 | Fedeli ................................... 277/354 |
| 5,906,136 | * | 5/1999 | Yabe et al. ............................. 74/459 |

* cited by examiner

Primary Examiner—Allan D. Herrmann
(74) Attorney, Agent, or Firm—Reising, Ethington, Barnes, Kisselle, Learman & McCulloch, P.C.

(57) ABSTRACT

A ball screw and nut linear actuator has a screw and nut with helical grooves and threads providing a helical raceway between them. The raceway has a ball return portion and provides a track for a train of recirculating load bearing balls. A wiper member carried by the nut has a helical wiper thread which is preloaded to engage an outer side of the helical groove of the screw outboard of the nut. The helical wiper thread has a radially open helical groove for maintaining and distributing a helical ribbon of lubricant on the side of the screw groove upon which it is pressed.

15 Claims, 2 Drawing Sheets

US 6,237,434 B1

BALL SCREW AND NUT ASSEMBLY WITH A NUT HAVING A PRELOADED WIPER THREAD AND METHOD OF ITS MANUFACTURE AND OPERATION

This invention is disclosed in provisional application Serial No. 60/098,435, filed Aug. 31, 1998, and this priority is claimed. The invention relates generally to ball screw and nut assemblies and more particularly to those having an axially preloaded wiper carried by the nut to reduce lash between the nut and screw.

BACKGROUND OF THE INVENTION

It is known to the art to provide the nut of a ball nut and screw assembly with a wiper member having an inner helical thread that is received in the helical groove of the screw. The wiper is typically preloaded by a spring in a direction axially away from the nut end wall, causing the thread of the wiper to be forced axially in one direction against a portion of the side wall of the screw groove in order to minimize axial play or lash between the nut and screw. As the thread of the wiper traverses the screw groove during operation of the assembly, it has a tendency to completely wipe lubricant from this wall portion of the screw groove.

It is a principal object of the present invention to address the lubrication problem associated with the use of a preloaded wiper.

SUMMARY OF THE INVENTION

A ball nut and screw assembly constructed according to the invention comprises a nut and screw having complemental helical lands and grooves providing a helical path or raceway for a plurality of recirculating load bearing balls. A wiper member is carried on the nut and is formed on its inner surface with a helical thread that has the same lead as and rides along the groove of the screw during operation of the assembly. The wiper is displaced axially away from a nut wall by a spring or other preloading or biasing assembly, forcing the thread of the wiper axially in one direction against an opposing side wall of the screw groove in order to minimize axial play or lash between the nut and screw. According to the invention, the axially outboard (relative to the nut) side surface of the wiper thread is formed with a helically extending lubricant collection and retention groove that is operative to retain a corresponding helical ribbon of the lubricant on the radial or side wall of the screw groove in order to insure the most desirable lubrication of the load bearing balls when they come into contact with this side portion of the screw's helical groove.

The invention also contemplates a method of constructing and operating such a ball nut and screw assembly including the provision of the lubricant-retention groove in the load applying face of the wiper thread such that, when assembled with the screw, the wiper of the present invention serves to retain a predetermined amount of lubrication on the wiper-engaged side wall of the screw groove for the benefit of the load bearing balls.

BRIEF DESCRIPTION OF THE DRAWINGS

A presently preferred embodiment of the invention is disclosed in the following description, and in the accompanying drawings, wherein.

DETAILED DESCRIPTION

Figure 1:
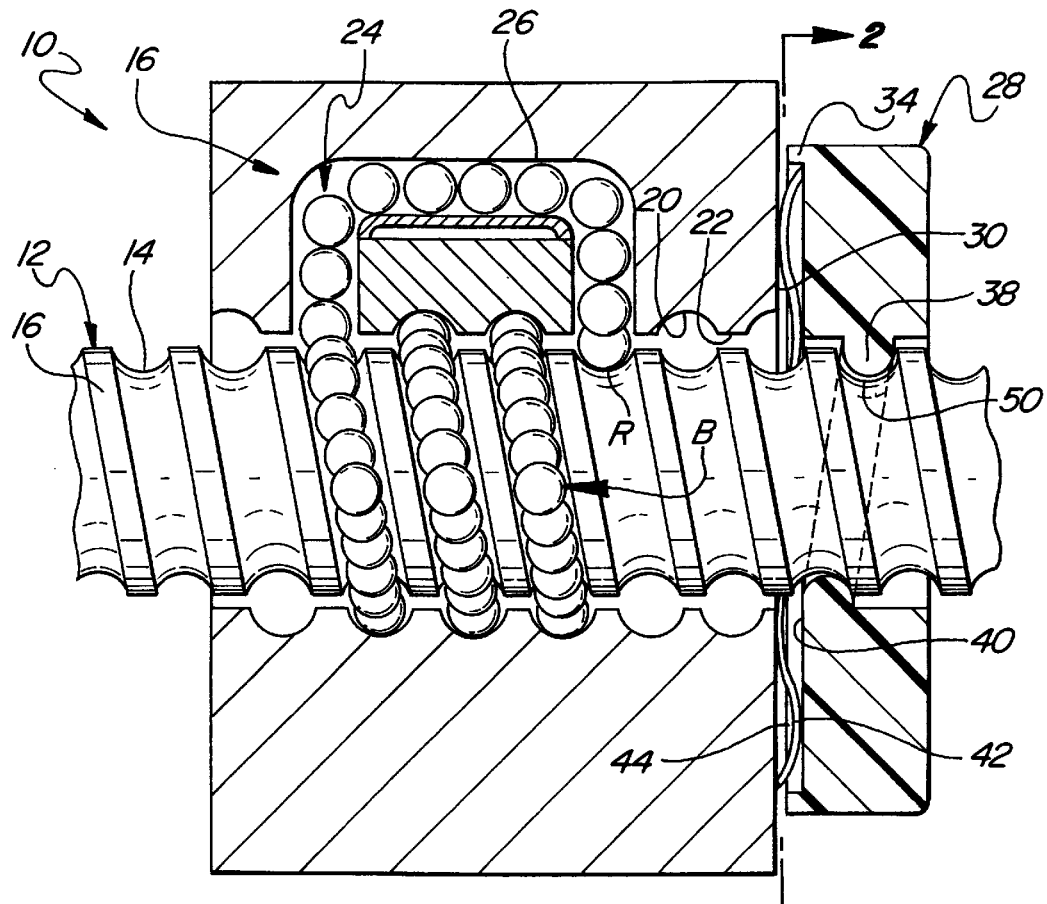
FIG. 1 is an enlarged schematic fragmentary sectional elevational view of a ball nut and screw assembly.
Figure 2:
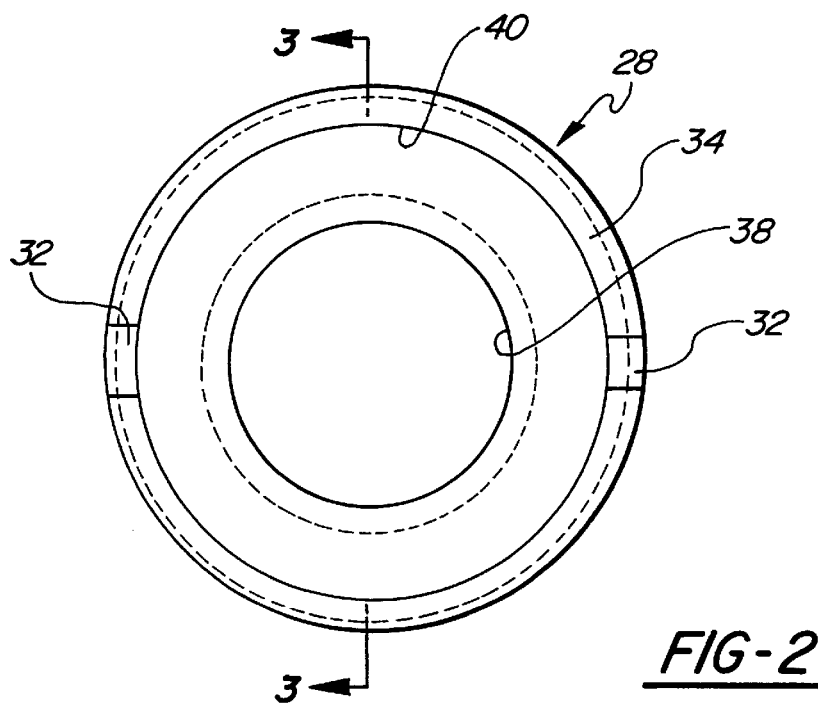
FIG. 2 is an end elevational shematic view of the wiper component carried by the nut, taken generally along the lines 2—2 of FIG. 1.

Turning now to the drawings, and initially to FIG. 1, a typical ball nut and screw assembly is shown generally at 10, and includes a typical elongate screw 12 having a helical groove 14 and land 16. Mounted on the screw 12 is a ball nut 18 which is generally cylindrical in configuration and formed on its inner face with a helical groove 20 and land 22 which complement the screw groove and land such that a ball raceway R is formed between them for accommodating a train of load bearing balls B in the usual manner. The nut 18 includes the usual ball return passage, generally designated 24, including an axial ball return portion 26 of the raceway, that functions to recirculate the train of balls B along an endless circuit within the nut 18. While an internal ball return passage is illustrated, it is to be understood that the passage could be external as well.

The nut 18 includes an anti-lash wiper member 28, carried by the nut 18 in any suitable manner adjacent an end or other appropriate face 30 of the nut 18. The wiper 28 shown comprises a generally rigid ring-like member encircling the screw 12 which may be formed with a pair of lugs 32 (FIG. 3) that extend axially inwardly from a face 34 of the wiper 28 to engage corresponding axial recesses 36 formed in the wall 30 of the nut housing 18 to prevent rotation of the wiper 28 relative to the nut 18, while enabling the wiper 28 to move axially relative to the nut 18. The wiper 28 is formed on its radially inward surface with a helical thread 38, of the same lead as the nut thread and screw groove 14, that projects radially inwardly and is accommodated within and complements the helical groove 14 of the screw 12. The thread 38 traverses, or is traversed by, the screw groove 14 during operation of the assembly 10.

Figure 4:
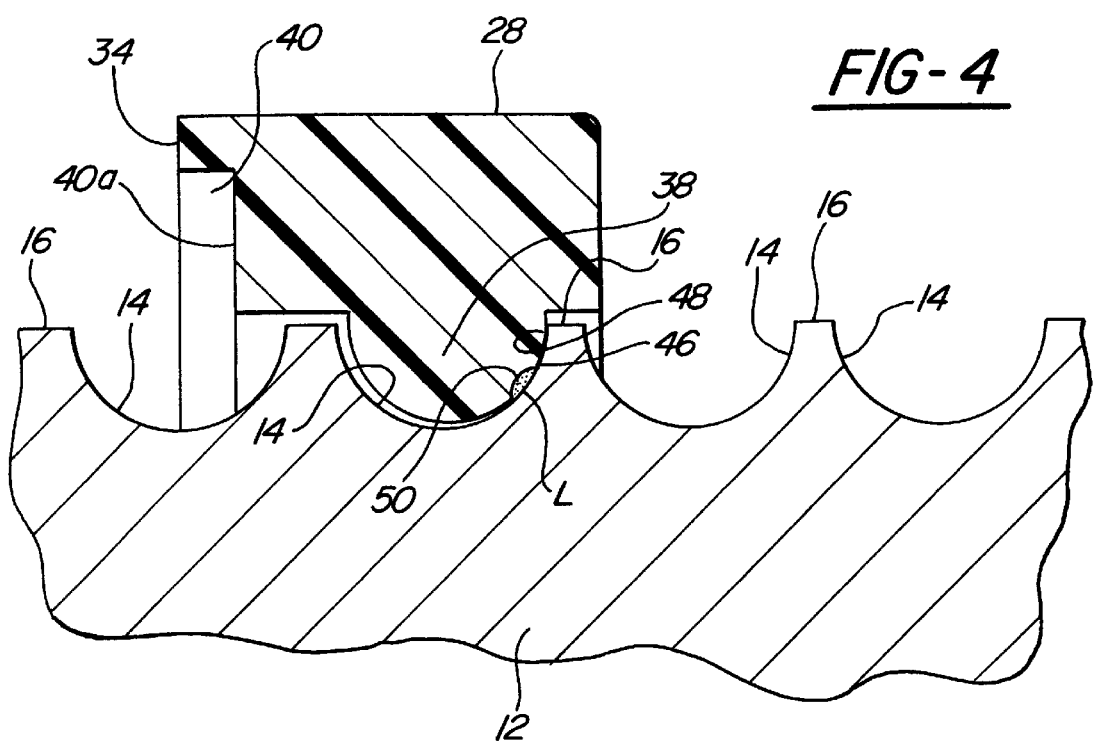
FIG. 4 is an enlarged fragmentary schematic sectional view more particularly illustrating the interaction between the wiper and screw.

The wiper 28 is preferably fabricated of a generally rigid, wear-resistant synthetic plastic material such as epoxy resin, and is preferably formed or molded on its axially inboard face 34 with a recess 40 in which a preload-creating member 42, or biasing member 42, can be accommodated. The member 42 may be in the preferred form of a spring washer, and preferably a so-called "wave spring", which comprises a resilient ring fabricated of spring steel or the like and formed with circumferential undulations that project axially, when in the relaxed state, to provide a thickness which is relatively greater than the axial gap 44 between the nut 18 and wiper 28. When the spring 42 is assembled with the wiper 28 and nut 18, it engages the end face 30 of the nut 18 and the face 40a of the recess 40 in the wiper 28, compressing the spring 42 toward a flattened, planar condition. In response, the reacting spring 42 acts on the wiper 28, forcing it axially away from the nut 18 and thereby, as shown in FIG. 4, constantly forcing a contacting axially outboard (relative to the raceway of the nut) radial or side surface 46 of the wiper thread 38 axially against an opposing radial or side surface 48 of the screw groove 14. As shown in FIGS. 1 and 4, the cross-sectional configuration of the wiper thread 38 closely approximates or mates with the screw groove 14, such that lubricant present on the surface 48 of the screw groove 14 normally tends to be almost completely wiped from the screw 12 by the contacting surface 46 of the wiper thread 38.

Figure 3:
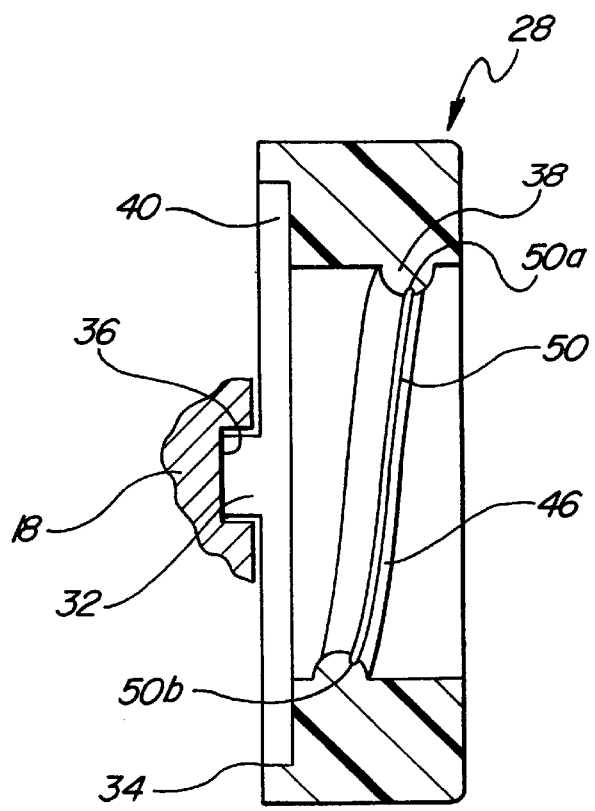
FIG. 3 is a sectional schematic view, taken along the lines 3—3 of FIG. 2.

The assembly thus far described is conventional. According to the present invention, a helically extending, lubricant-retention groove 50 of the same lead as thread 38 is formed in the axially outboard relative to the raceway R side surface 46 of the wiper thread 38, defining a radially open recess in the screw groove contacting surface 46 which extends substantially the length of the thread 38. The elongate lubricant-retention groove 50 is in the form of a helical slot or channel molded or cut into the outboard contacting surface 46 of the thread 38, as best shown in FIGS. 3 and 4. As FIG. 3 particularly indicates, the thread 38 and groove 50 extend circumferentially approximately half a turn. The ends 50a and 50b of the groove 50, which is not quite coextensive with the thread 38, are open.

In operation, as the axially restrained nut 18 rotates relative to the screw 12 and the screw is displaced axially therelong (or vice versa in the case of an axially stationary rotatable screw), the wiper 28 rotates with the nut 18, causing the thread 38 to wipe the screw groove 14. The lubricant-retention groove 50 maintains a thin, helically winding ribbon of the lubricant L (see FIG. 4) on the side surface 48 of the screw groove 14 (which otherwise would tend to be wiped clean of lubricant) for lubricating the load bearing balls B that subsequently come into contact with the screw groove surface 48 during normal operation of the assembly. With the present invention, lubricant remains in place on the screw groove outboard side 48 as the screw groove 14 moves axially from right to left in FIG. 1 past the wiper thread 38 and is contacted by the balls B recirculating in the rotating, axially restrained nut 18.

The invention further contemplates the method of constructing the ball nut and screw assembly and the method of maintaining a lubricant on a wall portion of the screw groove of a ball and nut assembly having an axially preloaded wiper member, and particularly involves the formation of the helical lubricant-retention groove 50 extending along the pre-loaded contacting surface of the wiper thread 38 that operates to maintain a thin stripe of lubricant L in the screw groove 14 for subsequently lubricating the load bearing balls B of the assembly 10.

The disclosed embodiment is representative of a presently preferred form of the invention, but is intended to be illustrative rather than definitive thereof. The invention is defined in the claims.

We claim:

1. A ball screw and nut linear actuator comprising:
   a. an axially extending screw having a helical groove bounded by a helical thread;
   b. a nut having an axially extending mating helical groove and thread received on said screw to provide a helical raceway formed by said screw and nut grooves;
   c. said raceway having a ball return portion and recirculating load bearing balls;
   d. a wiper member carried by said nut on a surface of said nut axially outboard of said raceway, said member having a helical wiper thread with axially opposed side walls received in said screw groove; and
   e. a radially open helical groove on one side of said wiper thread for maintaining a helical ribbon of lubricant on the screw groove for ball lubrication purposes.

2. The actuator of claim 1 wherein a biasing member is reactable to bias said wiper member in an axially outward direction relative to said nut.

3. The actuator of claim 1 wherein said biasing member comprises a compressible spring disposed between said nut and wiper member to press said wiper thread axially outwardly against a side wall of said screw groove.

4. The actuator of claim 3 wherein the portion of said screw groove removed from said nut in any relative axial position of the screw and nut has an axially outboard side against which said wiper thread is pressed and said wiper thread helical groove is in said axially outboard side.

5. The actuator of claim 4 wherein said groove is open axially at its ends.

6. The actuator of claim 4 in which said wiper thread groove extends approximately half a turn of said wiper thread.

7. A wiper adapted to attach to the nut of a ball screw and nut linear actuator to be fixed to said nut for rotation therewith but mounted to have a limited axial play relative to the nut, the actuator having:
   a. an axially extending screw having a helical groove bounded by a helical thread;
   b. a nut having an axially extending mating helical groove and thread received on said screw to provide a helical raceway formed by said screw and nut grooves;
   c. said raceway having a ball return portion containing recirculating load bearing balls;
   and wherein the wiper comprises:
   d. a generally rigid ring having a helical wiper thread with axially opposed side walls and having a lead to be received in the screw groove;
   e. a biasing member reactable to bias said wiper member in an axially outward direction away from the nut; and
   f. a helical radially open groove in the outward side wall of the wiper thread for distributing lubricant to the outward side wall of the screw groove against which it is pressed by the biasing member to distribute a helical ribbon of lubricant to the screw groove for ball lubrication purposes.

8. The wiper of claim 7 wherein said wiper thread groove is provided as opening endwisely at its ends.

9. The wiper of claim 7 wherein said wiper thread and said wiper thread groove are provided as extending about half a turn.

10. The wiper of claim 7 wherein said wiper ring is provided with a circular recess for receiving said biasing member which comprises a wave spring.

11. A method of constructing a ball screw and nut linear actuator comprising:
   a. providing an axially extending screw having a helical groove bounded by a helical thread;
   b. providing a nut with an axially extending mating helical groove and thread on said screw to provide a helical raceway; said nut being provided with and carrying a wiper member on an end surface of said nut axially outboard of the raceway having a helical wiper thread with axially opposed side walls received in the screw groove, the wiper thread having a radially open helical groove on one of its said side walls;
   c. providing recirculating load bearing balls in said raceway; and
   d. providing lubrication on said groove and nut thread and within said helical groove on the side of said wiper thread for maintaining and distributing a helical ribbon of lubricant on the screw groove for ball lubrication purposes.

12. The method of claim 11 wherein said wiper thread groove is provided as open axially at its ends and extends about half a turn of said wiper thread.

13. The method of claim 12 wherein the portion of the screw groove removed from the nut in any relative axial position of the screw and nut has an axially outboard side against which said wiper thread is pressed and said wiper thread helical groove is provided in said axially outboard side.

14. A method of operating a ball screw and nut linear actuator having an axially extending screw with a helical groove bounded by a helical thread; a nut having an axially extending mating helical groove and thread received on the screw to provide a helical raceway; said raceway having a ball return portion and incorporating abutting recirculating load bearing balls; a wiper member carried by the nut on a surface of the nut axially outboard of the raceway, said member having a helical wiper thread with axially opposed side walls received in said screw groove and a radially open helical groove on one said of said wiper thread, comprising:

a. relatively revolving the screw and nut so that the screw is traversed by or traverses the nut;

b. providing lubrication for said screw threads and within said wiper thread helical groove; and c. via said wiper thread groove, maintaining and distributing a helical ribbon of lubricant on a portion of the screw groove outboard of the nut for ball lubrication purposes.

15. The method of claim 14 comprising biasing said wiper member in an axially outward direction relative to said nut to press said wiper thread against an outer side of the screw groove and distributing said helical ribbon of lubricant as a helical ribbon on the said side of the screw groove against which the helical wiper thread is pressed by said biasing member.

* * * * *